Aug. 30, 1960    R. A. MAGRATH    2,951,224
BOLOMETER FOR RADIATION DETECTION
Filed April 5, 1957
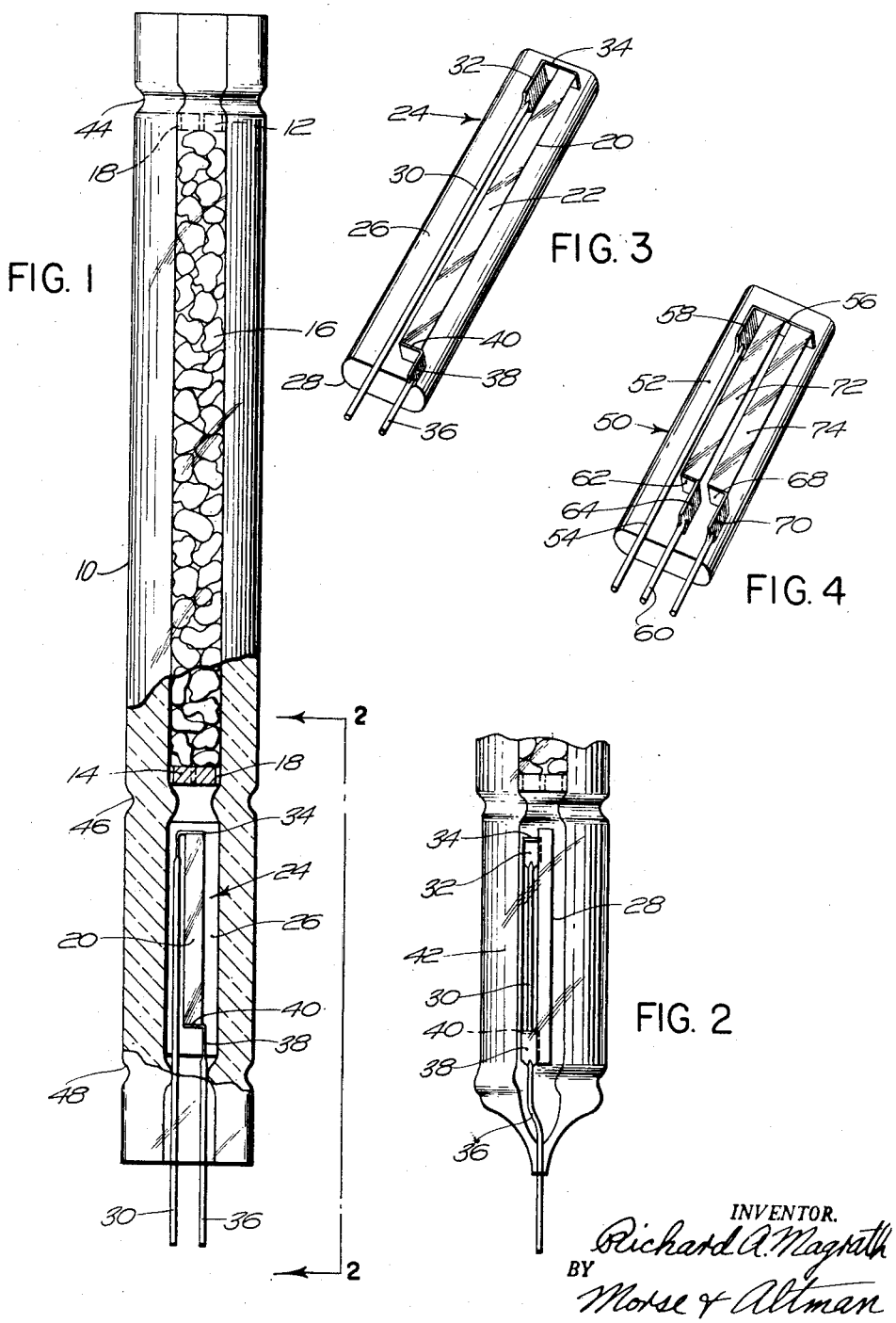
INVENTOR.
Richard A. Magrath
BY
Morse & Altman

United States Patent Office 2,951,224
Patented Aug. 30, 1960

2,951,224

BOLOMETER FOR RADIATION DETECTION

Richard A. Magrath, Boston, Mass., assignor to Baird-Atomic, Inc., a corporation of Massachusetts Filed Apr. 5, 1957, Ser. No. 651,031

2 Claims. (Cl. 338—18)

The present invention relates to radiation detecting devices and, more particularly, to infra-red radiation detecting devices, commonly known as bolometers, of the type comprising a thin metallic strip that changes in electrical resistance in response to temperature variation produced by incident infra-red radiation.

The object of the present invention is to provide a novel bolometer unit that may be installed with unusual convenience, for example, in an infra-red recording spectrometer or the like, by virtue of its being permanently evacuated in a manner made possible by a novel association of components including (1) a casing entirely composed of a material that is transparent to radiation in the wave-length range to which a metallic strip within the casing is sensitive, (2) a specially designed mount for the metallic strip having only a few elements of selected composition for the purpose of minimizing the release of gaseous products within the casing, and (3) a chemical trap that absorbs any gas present within the casing.

Other objects of the present invention will in part be obvious and in part will appear hereinafter.

The invention accordingly comprises the product possessing the features, properties and relation of components, which are exemplified in the following detailed disclosure, and the scope of which will be indicated in the appended claims.

For a fuller understanding of the nature and objects of the present invention, reference should be had to the following detailed description, taken in connection with the accompanying drawing wherein:

Figure 1 is a front elevation, partially broken away, of an infra-red sensitive bolometer incorporating the present invention;

Fig. 2 is a fragmentary cross-sectional view of the bolometer of Fig. 1, taken substantially along the lines 2—2;

Fig. 3 is a perspective view of the mount for the radiation-sensitive metallic strip of the bolometer of Fig. 1; and Fig. 4 is a perspective view of the mount for a pair of radiation-sensitive metallic strips of an alternative bolometer similar in all remaining respects to the bolometer of Fig. 1.

The operating components of the illustrated bolometer are contained within a tube 10, the opposite ends of which are sealed in a manner to be described below. Tube 10, which is about 3 inches in overall length and 3/16 inch in overall diameter, preferably a silver halide such as silver chloride, which is transparent to infra-red radiation. The entire tube is constructed of this material, which has little tendency to absorb or to emit gaseous products. This construction avoids the necessity for associating a window of this material with a tube of another material by means of a cement that would tend to complicate the system and thus to increase the likelihood of emission of such gaseous products within the tube. Generally the interior of tube 10 is permanently evacuated to a pressure of less than .05 mm. A pair of stops 12 and 14, each in the form of a disk having the same diameter as the interior of tube 10, position therebetween a quantity of activated carbon granules 16 capable of absorbing and/or adsorbing any gases emitted by the various components within the tube. In alternative embodiments, carbon granules 16 are replaced by other activated inorganic granules composed, for example, of an aluminum compound such as alumina or a silicon compound such as silica. Each of stops 12 and 14 is peripherally slotted at 18 to permit communication between carbon granules 16 and the remaining components now to be described.

These remaining components include an extremely thin metallic strip 20 having on only one face a black coating 22. Strip 20, for example, is composed of platinum about .1 micron thick and coating 22, for example, is composed of gold black. As shown in Fig. 3, strip 20 is carried by a glass insert 24 having a pair of opposed faces 26 and 28 that have been ground from a rod of the same diameter as the interior of tube 10 so that the glass insert may be retained securely within the tube. Preferably, insert 24 is composed of a heat resistant glass, such as Pyrex, that will not crack when unevenly heated. Extending over face 26 of insert 24 is a first lead 30 in the form of a platinum wire, whose inner end is flattened and bent to provide an L-shaped integral extension having right angle arms 32 and 34. Also extending from over face 26 of insert 24 is a second lead 36 in the form of a platinum wire whose inner end is flattened and bent to provide an L-shaped integral extension having right angle arms 38 and 40. As shown in Fig. 3, the lower edges of these right angle arms are embedded within face 26 of insert 24, for example, by melting the glass only in the immediate vicinity of the arms and pressing the lower edges of the arms into the molten region. The extremities of metallic strip 20 are secured to the parallel transverse arms 34 and 40 at their upper edges, for example, by a solder such as is composed of a tin-bismuth alloy. In the vicinity of insert 24, tube 10 is flattened along a plane parallel to face 26 of insert 24 and metallic strip 20 to provide a distortion free window 42 (Fig. 2) for infra-red radiation incident upon coating 22.

In assembling the foregoing components within tube 20, stops 12 and 14, with activated carbon granules 16 therebetween, and insert 24 are secured in position with respect to each other by peripheral beads 44, 46, and 48. Next, the end of tube 10, through which leads 30 and 36 extend, is hermetically sealed under heat and pressure. Then the interior of tube 10 is evacuated under heat, of the order of about 100° to 200° C., which serves to de-gas the components within the tube, in particular carbon granules 16. Finally, the end of tube 10 remaining open is merely pinched together in order to provide a hermetic seal.

In an alternative embodiment of the present invention, as shown in Fig. 4, insert 24 is replaced by an insert 50 that is similar to insert 24 in construction and composition. Extending over face 52 of insert 50 is a first lead 54 in the form of a platinum wire whose inner end is flattened and bent to provide an L-shaped integral extension having right angle arms 56 and 58. Also extending over face 52 are: a second lead 60 in the form of a platinum wire, whose inner end is flattened and bent to provide an L-shaped integral extension having right angle arms 62 and 64; and a third lead 66 in the form of a platinum wire, whose inner end is flattened and bent to provide an L-shaped integral extension having right angle arms 68 and 70. As shown a pair of thin metallic strips 72 and 74, similar in all respects to strip 20, extend between the upper edges of arm 56 and of arms 62 and 68, respectively. Arms 56 and 58, 62 and 64, and 68 and 70 are embedded in face 52 of insert 50 in the manner described above in reference to Fig. 3.

In operation, by virtue of the small number of components within tube 10 and the careful selection of the materials of which they are composed, carbon granules 16 are able to absorb the trivial quantities of gaseous products emitted within the tube and the bolometer output is relatively free of noise.

Since certain changes may be made in the above product without departing from the scope of the invention herein involved, it is expressly to be stated that all matter contained in the accompanying drawings or referred to in the above description be considered in an illustrative and not in a limiting way.

What is claimed is:

1. An instrument electrically responsive to radiation of a predetermined wavelength range, said instrument comprising a sealed tube transparent to said radiation, an absorbing medium including activated inorganic granules within said tube, at least a metallic strip within said tube, a first lead extending from one end of said metallic strip through one end of said tube, and a second lead extending from the other end of said metallic strip through said one end of said tube, an electrically insulating mount for predeterminedly positioning said metallic strip within said tube, said first lead including an L-shaped extension one end of which is imbedded in said mount and another edge of which is connected to an extremity of said strip, said second lead including an L-shaped extension one end of which is embedded in said mount and the other end of which is secured to another extremity of said strip.

2. A bolometer for detecting infra-red radiation, said bolometer comprising an elongated tube composed of a material transparent to infra-red radiation, a quantity of granules of an activated inorganic material distributed within one region of said tube, a glass insert positioned within another region of said tube, said glass insert having a flat face and longitudinal edges of circular cross-section, said cross-section, and the inner surface of said tube being of the same radius, at least one metallic strip within said tube, a first lead extending from one end of said metallic strip through one end of said tube, and a second lead extending from the other end of said metallic strip through said one end of said tube, said tube being composed of silver halide, the portion of said tube facing said metallic strip being flattened, said one end of said metallic strip and said first lead being secured to a sheet metal element imbedded in said insert, said other end of said metallic strip and said second lead being secured to a sheet metal element imbedded in said insert, said insert being composed of glass, said metallic strips and said leads being composed of platinum, said one region and said other region being separated from each other by an apertured stop, said apertured stop being secured in position within said tube by peripheral beading.

References Cited in the file of this patent

UNITED STATES PATENTS

| | | |
|---|---|---|
| 2,423,476 | Billings et al. | July 8, 1947 |
| 2,543,369 | Kling | Feb. 27, 1951 |
| 2,561,077 | Tilton | July 17, 1951 |
| 2,635,468 | Field et al. | Apr. 21, 1953 |

FOREIGN PATENTS

| | | |
|---|---|---|
| 342,055 | Great Britain | Jan. 29, 1931 |
| 626,915 | Great Britain | July 22, 1949 |
| 626,920 | Great Britain | July 22, 1949 |
| 777,941 | France | Mar. 5, 1935 |